United States Patent
Moldoveanu et al.

(10) Patent No.: US 10,520,623 B2
(45) Date of Patent: Dec. 31, 2019

(54) METHODS AND SYSTEMS FOR MARINE SURVEY ACQUISITION

(71) Applicant: WESTERNGECO L.L.C., Houston, TX (US)

(72) Inventors: Nicolae Moldoveanu, Houston, TX (US); Massimiliano Vassallo, Brighton (GB); Claudio Bagaini, Bekkestua (NO)

(73) Assignee: WESTERNGECO L.L.C., Houston, TX (US)

( * ) Notice: Subject to any disclaimer, the term of this patent is extended or adjusted under 35 U.S.C. 154(b) by 591 days.

(21) Appl. No.: 13/907,522

(22) Filed: May 31, 2013

(65) Prior Publication Data

US 2014/0355379 A1    Dec. 4, 2014

(51) Int. Cl.
*G01V 1/38* (2006.01)

(52) U.S. Cl.
CPC .................. *G01V 1/3808* (2013.01)

(58) Field of Classification Search
CPC .............................. G01V 1/38; G01V 1/3808
USPC .......................................................... 367/21
See application file for complete search history.

(56) References Cited

U.S. PATENT DOCUMENTS

| | | | |
|---|---|---|---|
| 3,368,191 A * | 2/1968 | McDonal | 367/23 |
| 4,558,437 A * | 12/1985 | Meeder et al. | 367/15 |
| 5,051,961 A | 9/1991 | Corrigan et al. | |
| 6,775,618 B1 | 8/2004 | Robertsson et al. | |
| 7,876,642 B2 | 1/2011 | Robertsson et al. | |
| 8,339,896 B2 | 12/2012 | van Borselen et al. | |
| 8,488,409 B2 * | 7/2013 | Hill | G01V 1/3808 367/15 |
| 8,559,265 B2 * | 10/2013 | Moldoveanu | G01V 1/3808 367/15 |

(Continued)

FOREIGN PATENT DOCUMENTS

| | | |
|---|---|---|
| EP | 2420865 | 2/2012 |
| EP | 2534505 | 12/2012 |

(Continued)

OTHER PUBLICATIONS

International Search Report and Written Opinion issued in PCT/US2014/039052 dated Sep. 18, 2014, 16 pages.

(Continued)

*Primary Examiner* — Isam A Alsomiri
*Assistant Examiner* — Amie M Ndure (57) ABSTRACT

Methods and systems for marine survey acquisition are disclosed. In one embodiment, a method is provided that may deploy a marine seismic spread that includes a first seismic source, a second seismic source and a streamer with a receiver. The second source may be disposed at a distance from the first seismic source in an inline direction. The distance may be selected to produce one or more pairs of shot points during a seismic survey. The shot points within a pair may be disposed within a range that is used to calculate a pressure source gradient between the shot points within the pair. The method may shoot the first seismic source and the second seismic source substantially simultaneously. The method may record seismic data associated with shooting the first seismic source and the second seismic source. The method may calculate the pressure source gradient for respective pairs of shot points.

9 Claims, 8 Drawing Sheets

(56) References Cited

U.S. PATENT DOCUMENTS

| | | | |
|---|---|---|---|
| 2008/0008037 A1* | 1/2008 | Welker | G01V 1/38 367/21 |
| 2008/0019215 A1* | 1/2008 | Robertsson et al. | 367/19 |
| 2008/0285381 A1* | 11/2008 | Moldoveanu | G01V 1/3808 367/20 |
| 2009/0003132 A1 | 1/2009 | Vassallo et al. | |
| 2010/0067326 A1* | 3/2010 | Iranpour et al. | 367/20 |
| 2010/0124149 A1* | 5/2010 | Barr, Jr. | 367/24 |
| 2010/0182873 A1* | 7/2010 | Kluver | 367/21 |
| 2011/0110189 A1* | 5/2011 | Riyanti et al. | 367/24 |
| 2011/0194379 A1 | 8/2011 | Lee et al. | |
| 2011/0199857 A1* | 8/2011 | Garden | 367/20 |
| 2011/0199863 A1* | 8/2011 | Frivik | 367/131 |
| 2011/0242937 A1 | 10/2011 | Söllner et al. | |
| 2011/0310700 A1 | 12/2011 | Robertsson et al. | |
| 2012/0008459 A1* | 1/2012 | Coste et al. | 367/23 |
| 2012/0120760 A1* | 5/2012 | Groenaas et al. | 367/20 |
| 2013/0100762 A1 | 4/2013 | Robertsson et al. | |
| 2013/0114375 A1 | 5/2013 | Meier et al. | |
| 2014/0043936 A1* | 2/2014 | Poole | 367/21 |
| 2014/0355379 A1* | 12/2014 | Moldoveanu | G01V 1/3808 367/15 |

FOREIGN PATENT DOCUMENTS

| | | |
|---|---|---|
| WO | 2009012024 | 1/2009 |
| WO | 2010002616 | 1/2010 |

OTHER PUBLICATIONS

Halliday et al., "Full-wavefield, towed-marine seismic acquisition and applications," SEG Las Vegas Annual Meeting, 2012: pp. 1-5.
Moore, "B001: Simultaneous Sources—Processing and Applications," 72nd EAGE Conference & Exhibition, Jun. 2010: pp. 1-5.
International Preliminary Report on Patentability issued in the related PCT application PCT/US2014/039052, dated Dec. 1, 2015 (10 pages).
Office Action for the equivalent Mexican patent application MX/a/2015/016370 dated Jun. 13, 2017.

* cited by examiner

METHODS AND SYSTEMS FOR MARINE SURVEY ACQUISITION

BACKGROUND

This section is intended to provide background information to facilitate a better understanding of various technologies described herein. As the section's title implies, this is a discussion of related art. That such art is related in no way implies that it is prior art. The related art may or may not be prior art. It should therefore be understood that the statements in this section are to be read in this light, and applicant neither concedes nor acquiesces to the position that any given reference is prior art or analogous prior art.

Seismic exploration may utilize a seismic energy source to generate acoustic signals that propagate into the earth and partially reflect off subsurface seismic reflectors (e.g., interfaces between subsurface layers). The reflected signals are recorded by sensors (e.g., receivers or geophones located in seismic units) laid out in a seismic spread covering a region of the earth's surface. The recorded signals may then be processed to yield a seismic survey.

In a spread for a seismic survey, a plurality of sources and receivers may be arranged in a grid, such that the recorded data from the wavefields may substantially cover the entire area of exploration and with sufficient resolution to detect the variation of the sub-surface structure over small spatial distances. The wavefields recorded by the receivers may be a result of the superposition of many waves having different paths through the earth's sub-surface before finally reaching the receivers. This may make the reconstruction of the earth sub-surface difficult. One objective of seismic data processing is to separate the wavefields into coherent waves in connection with creating an accurate image of the earth's sub-surface layers. Because seismic data acquisition is quite expensive, it is desirable to increase the distance between the grid points and still provide sufficient resolution or use the same or tighter grid and achieve finer resolution.

SUMMARY

Described herein are implementations of various technologies for methods and systems for marine survey acquisition. The method may deploy a marine seismic spread that may include a first seismic source, a second seismic source and a streamer with a receiver. The second seismic source maybe disposed at a distance from the first seismic source in an inline direction. The distance may be selected to produce one or more pairs of shot points during a seismic survey. The shot points within a pair may be disposed within a predetermined range that is used to calculate a pressure source gradient between the shot points within the pair. The method may shoot the first seismic source and the second seismic source substantially simultaneously. The method may record seismic data associated with shooting the first seismic source and the second seismic source. The method may calculate the pressure source gradient for respective pairs of shot points.

In another implementation a marine survey acquisition system is disclosed that may include a vessel for towing a marine survey spread. The survey spread may include a first source, a second source and a streamer with a receiver. The second source may be separated from the first source at a distance in an inline direction. The distance in the inline direction may be selected to produce one or more pairs of shot points during a marine survey. The shot points within a pair may be disposed within a predetermined range that is used in calculating a source gradient between the shot points within the pair.

In another implementation a method is disclosed that may deploy a marine seismic spread that may include a first seismic source, a second seismic source and a streamer with a receiver. The second seismic source may be disposed at a distance from the first seismic source in a crossline direction. The distance may be selected to produce one or more pairs of crossline shot points during a seismic survey. The crossline shot points within a pair may be disposed within a predetermined range that is used to calculate a pressure source gradient between the crossline shot points within the pair. The method may shoot the first seismic source and the second seismic source substantially simultaneously. The method may record seismic data associated with shooting the first seismic source and the second seismic source. The method may calculate the pressure source gradient for respective pairs of crossline shot points.

The above referenced summary section is provided to introduce a selection of concepts that are further described below in the detailed description section. The summary is not intended to identify specific features of the claimed subject matter, nor is it intended to be used to limit the scope of the claimed subject matter. Furthermore, the claimed subject matter is not limited to implementations that solve any or most disadvantages noted in any part of this disclosure. Indeed, the systems, methods, processing procedures, techniques, and workflows disclosed herein may complement or replace conventional methods for identifying, isolating, and/or processing various aspects of seismic signals or other data that is collected from a subsurface region or other multi-dimensional space, including time-lapse seismic data collected in a plurality of surveys.

BRIEF DESCRIPTION OF THE DRAWINGS

Implementations of various technologies will hereafter be described with reference to the accompanying drawings. It should be understood, however, that the accompanying drawings illustrate various implementations described herein and are not meant to limit the scope of various technologies described herein.

DETAILED DESCRIPTION

The discussion below is directed to certain specific implementations. It is to be understood that the discussion below is for the purpose of enabling a person with ordinary skill in the art to make and use any subject matter defined now or later by the patent "claims" found in any issued patent herein.

Reference will now be made in detail to various implementations, examples of which are illustrated in the accompanying drawings and figures. In the following detailed description, numerous specific details are set forth in order to provide a thorough understanding of the claimed invention. However, it will be apparent to one of ordinary skill in the art that the claimed invention may be practiced without these specific details. In other instances, well known methods, procedures, components, circuits, and networks have not been described in detail so as not to unnecessarily obscure aspects of the claimed invention.

It will also be understood that, although the terms first, second, etc. may be used herein to describe various elements, these elements should not be limited by these terms. These terms are used to distinguish one element from another. For example, a first object or block could be termed a second object or block, and, similarly, a second object or block could be termed a first object or block, without departing from the scope of various implementations described herein. The first object or block, and the second object or block, are both objects or blocks, respectively, but they are not to be considered the same object or block.

The terminology used in the description herein is for the purpose of describing particular implementations and is not intended to limit the claimed invention. As used herein, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises," and/or "comprising," when used in this specification, specify the presence of stated features, integers, blocks, operations, elements, and/or components, but do not preclude the presence or addition of one or more other features, integers, blocks, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Various implementations described herein are directed to methods and systems for acquiring seismic data for calculating a pressure source gradient. These implementations will be described in more detail with reference to FIGS. 1-8.

Figure 1:
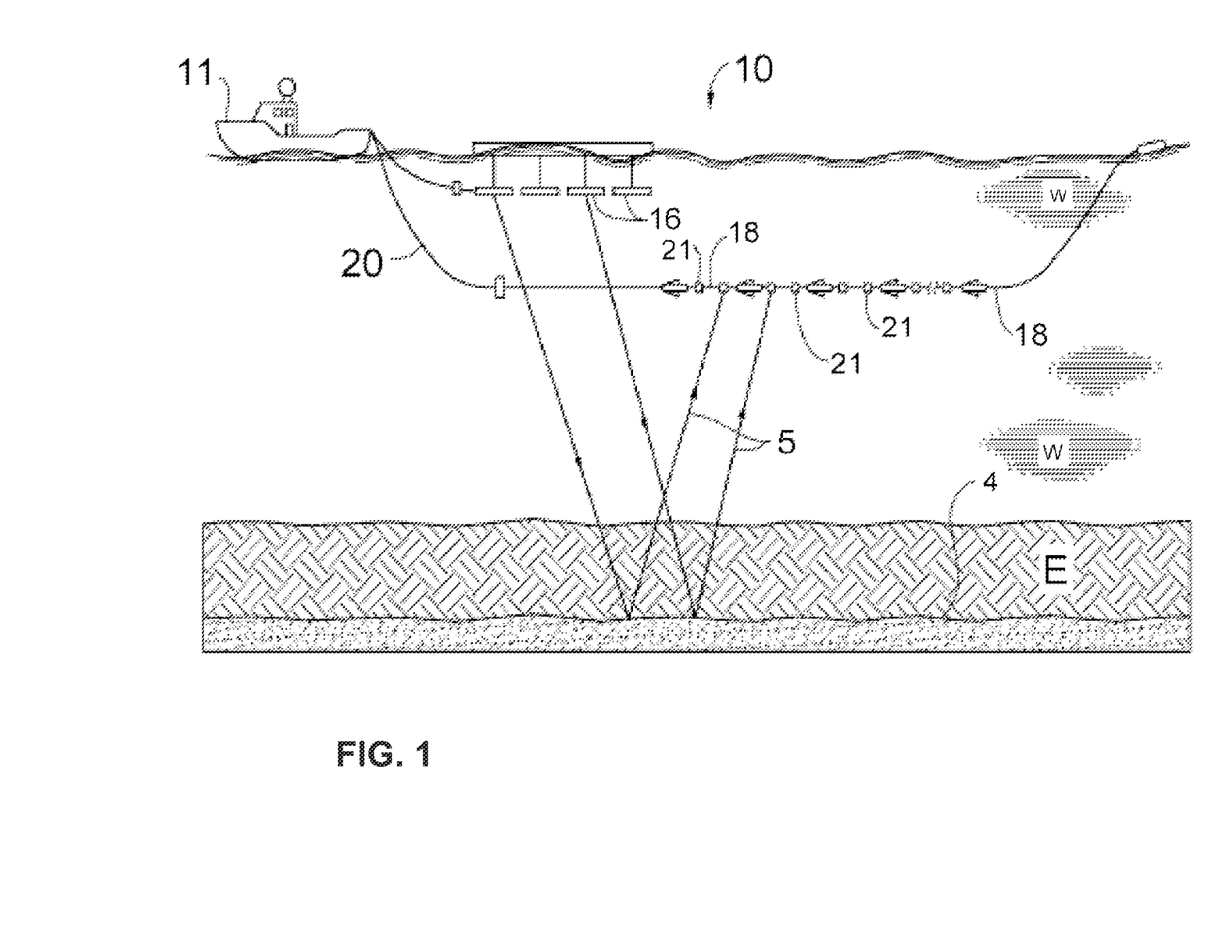
FIG. 1 illustrates a diagrammatic view of marine seismic surveying in accordance with various implementations described herein.

FIG. 1 illustrates a diagrammatic view of marine seismic surveying 10 in accordance with implementations of various techniques described herein. A marine seismic acquisition system 10 may include a vessel 11 carrying control components and towing a plurality of seismic sources 16 and a plurality of streamers 18 equipped with seismic receivers 21. The seismic sources 16 may include a single type of source, or different types. The sources may use any type of seismic generator, such as air guns, water guns, steam injection sources, explosive sources such as dynamite or gas injection followed by detonation and the like. The streamers 18 may be towed by means of their respective lead-ins 20, which may be made from high strength steel or fiber-reinforced cables that convey electrical power, control, and data signals between the vessel 11 and the streamers 18. An individual streamer may include a plurality of seismic receivers 21 that may be distributed at spaced intervals along the streamer's length. The seismic receivers 21 may include hydrophone sensors as well as multi-component sensor devices, such as accelerometers. Further, the streamers 18 may include a plurality of inline streamer steering devices (SSDs), also known as "birds." The SSDs may be distributed at appropriate intervals along the streamers 18 for controlling the streamers' depth and lateral movement. A single survey vessel may tow a single receiver array along individual sail lines, or a plurality of survey vessels may tow a plurality of receiver arrays along a corresponding plurality of the sail lines.

During acquisition, the seismic sources 16 and the seismic streamers 18 may be deployed from the vessel 11 and towed slowly to traverse a region of interest. The seismic sources 16 may be periodically activated to emit seismic energy in the form of an acoustic or pressure wave through the water. The sources 16 may be activated individually or substantially simultaneously with other sources. The acoustic wave may result in one or more wavefields that travel coherently into the earth E underlying the water W. As the wavefields strike interfaces 4 between earth formations, or strata, they may be reflected back through the earth E and water W along paths 5 to the various receivers 21 where the wavefields (e.g., pressure waves in the case of air gun sources) may be converted to electrical signals, digitized and transmitted to the integrated computer-based seismic navigation, source controller, and recording system in the vessel 11 via the streamers 18 and lead-ins 20. Through analysis of these detected signals, it may be possible to determine the shape, position and lithology of the sub-sea formations, including those formations that may include hydrocarbon deposits.

Calculating a Pressure Source Gradient Between Shot Points

In a marine seismic survey as described for FIG. 1 above, monopole data may be recorded. Monopole data may refer to the seismic data recorded at the receivers in response to a single source or source group. Dipole data may refer to the data recorded at the receivers in response to two sources or source groups activated at locations in close proximity. Close proximity may refer to the distance between two sources or source groups that is within a fraction of the minimum wavelength of the seismic waves of interest. In many seismic surveys, close proximity may be about 3 meters to about 15 meters. Multi-pole data may refer to data recorded at the receivers in response to multiple sources or source groups activated in close proximity with appropriate polarities. In one instance, dipole or multi-pole data may be acquired by conducting two or more surveys where individual surveys may collect monopole data in close proximity to the shot point or shot position of another survey. Two shot points located in close proximity from either the same survey or a different survey may form a respective pair of shot points (e.g., a pair of inline shot points or crossline shot points). Dipole or multi-pole data may also be acquired by sequentially activating sources in a single survey such that two or more monopole responses may be recorded in close proximity to pre-defined shot positions.

With dipole or multi-pole data, source-side derivatives may be generated and used in various applications to enhance image accuracy and resolution. The source-side derivative or source-side gradient across two or more shot positions or shot points may be calculated by taking the difference of the two Green's Functions (GF) and dividing by the distance between the two source locations, as expressed by the following equation:

$$\partial P_{x_i} = \frac{\overrightarrow{GF}_1 - \overrightarrow{GF}_2}{\Delta x_i} + O(\Delta x_i^2) \quad \text{Equation 1}$$

A Green's function, as used in equation 1, may be the response of the subsurface recorded as a function of time at a receiver and due to an impulsive source at a particular location. For a finite difference approximation of Equation 1, the following equation may be used:

$$\text{Gradient} = \frac{f(x+h) - f(x)}{dh} \quad \text{Equation 2}$$

Using the finite difference approximation, the gradient may be calculated by taking the difference of a pressure measurement at location x+h and a pressure measurement at location x. The location x+h or the location x may correspond to individual shot points or source locations during an acquisition in a seismic survey. The difference is then divided by the space interval dh, (i.e., the change in location between shot points) which may be dx or dy as used in Equations 3 or 4 (described below), respectively.

Higher order derivatives in one or several directions may also be calculated if three or more source groups were used in acquisition. For example, dipole data may be used to generate first degree derivative data. Tri-pole data may be used to generate second degree derivatives. Higher order derivatives, which may improve various applications of source-side derivatives, may also be generated.

A pressure source gradient that is obtained for a particular direction, such as the inline or crossline directions, may assist in multi-component interpolation in the source coordinates domain. Further, when gradients of the pressure wavefield at receiver positions are also available, multi-domain multi-component interpolation may be performed with the interpolation techniques that are used for the receiver's side interpolation, but applied to the multi-dimensional case. Example domains that use such interpolation techniques may include the common-offset domain or the common receiver domain. Another application for calculating pressure source gradients may include deghosting. Deghosting a wavefield generally refers to the process of removing the down-going wavefield from the up-going wavefield.

Seismic Acquisition for Inline Pressure Source Gradients

Figure 2:
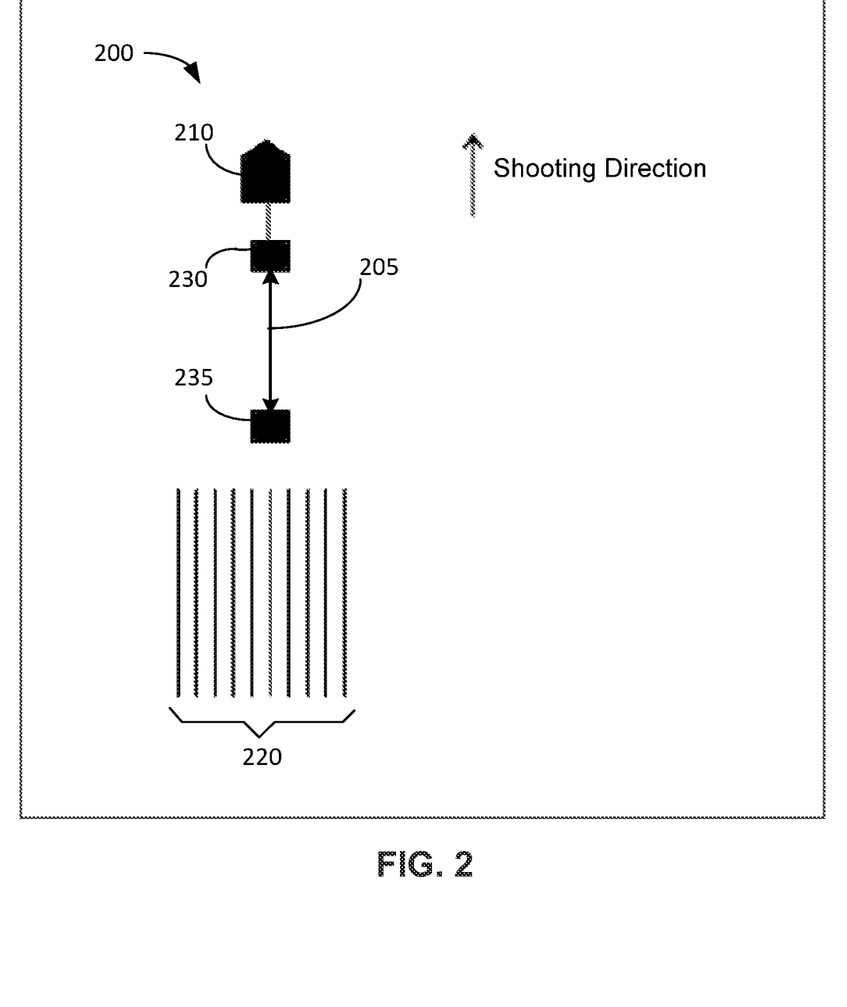
FIG. 2 illustrates a marine seismic survey acquisition system in accordance with various implementations described herein.

FIG. 2 illustrates a marine seismic survey acquisition system 200 using towed source arrays in accordance with various implementations described herein. The acquisition system 200 includes a vessel 210 towing a streamer array 220, an S1 source array 230 and an S2 source array 235. A source array may be a single source or a source group, where a source group may be treated as a single point source for analyzing seismic data.

The S1 source array 230 and the S2 source array 235 are shot according to an inline shot interval (also referred to as the source interval). Here, the S1 source array 230 and S2 source array 235 may be shot using simultaneous source separation techniques. Simultaneous source separation techniques may allow sources to be shot at the same time or substantially the same time, while allowing recorded seismic data for one source to be separated from recorded seismic data for other sources during data processing. For instance, the emitted wavefields from one source array may be encoded in such a manner as to enable recorded seismic data for that source to be decoded in post-processing. Where multiple encoded source arrays are shot at substantially the same time, seismic data associated with individual sources may be decoded and separated from the rest of the data associated with other sources.

One example of a simultaneous source separation technique may include having the S1 source array 230 shot according to a substantially constant time interval, while the S2 source array 235 may be shot according to a dither time referenced to the time interval of the S1 source array 230. The constant time interval may correspond to the inline shot interval used for source sampling during a seismic survey. This separation technique may allow separating of any sources in a domain where seismic traces correspond to different source locations, such as the common receiver or common offset domain. One source array may be coherent within that domain, while any other sources may have a random time distribution. For the acquisition system 200, either of the two source arrays may be shot according to the constant time interval with the other source array shot using a proper dither time.

Another simultaneous source separation technique may include using sources with a controllable phase, such as vibroseis or a marine vibrator. In this technique, individual sources may be encoded based on the phase shift between them. One criterion for the determination of the phase shift used for separating the individual sources may be that the shortest emitted wavelength is sampled at approximately ⅓ of the wavelength's length. The two-point finite difference approximation of Equation 2 may in fact be a good approximation of the source gradient up to approximately ⅓ of the Nyquist frequency. For instance, emission of two source signals with a π/3 phase shift may generate a composite signal at a receiver that can be used to determine the local spatial derivative. In other words, the emission of signals with phase shift from basically co-located sources may determine a wavefield equivalent to that generated by sources whose distance is frequency (wavelength) dependent. A virtual space separation may have been obtained although the two sources are in essence co-located. One assumption may be that the ground properties do not change when we move from a physical space separation to a virtual space separation plus a difference in location (i.e., a delta value). This assumption may also be applied when the gradient is determined from two locations that actually are deltas apart.

Using a particular acquisition system, such as the above acquisition system 200, a shot distribution may be selected that produces respective shot point pairs for calculating pressure source gradients between shot points within a respective pair. To calculate pressure source gradients, the selected shot distribution may place individual shot points within a predetermined range or in close proximity (i.e., dx or dy from Equations 3 or 4, respectively) to another shot point, thereby forming a respective shot point pair. In regard to the acquisition system 200, the shot distribution produced during a seismic survey may result in pairs of inline shot points that are used to calculate inline pressure source gradients between the shot points within the respective pairs.

In one implementation, to produce a shot distribution for calculating inline pressure source gradients, a distance 205 in the inline direction between the S1 source array 230 and the S2 source array 235 may be selected based on this objective. The distance 205 in the inline direction may be calculated using the following equation:

Source Separation in Inline Direction=$(n*ds) \pm dx$      Equation 3

The plus or minus operator denotes whether the shot point for the S2 source array 235 is located in front or behind the shot point for the S1 source array 230. * is the multiplication operator, the n factor may be a scalar value (1, 2, 3, . . . ), ds may be the shot interval in the inline direction (i.e., the inline shot interval), and dx may be the shot point separation distance in the inline direction or predetermined range that is used to calculate the inline pressure source gradient. The inline shot interval may correspond to the inline source sampling used during a seismic survey. For instance, the inline shot interval may describe the manner that one or both source arrays are shot at periodic intervals during a seismic survey. The n factor may be used to provide spacing between both source arrays in order to make processing recorded seismic data easier for one or both source arrays. If the inline shot interval is too close (or the source sampling is too dense) to apply optimal simultaneous source separation techniques, an n factor with a value of 1 may not suffice, and therefore another n factor such as 2 or 3 may be used to optimize data processing. For a practical example of possible dimensions used in the acquisition system 200, the distance dx may be 4 to 6 meters, while the inline shot interval ds may be from 18.75 m to 150 meters. An example shot distribution using a selected distance 305 in the inline direction between the S1 source array 230 and the S2 source array 235 is shown in FIG. 3.

Figure 3:
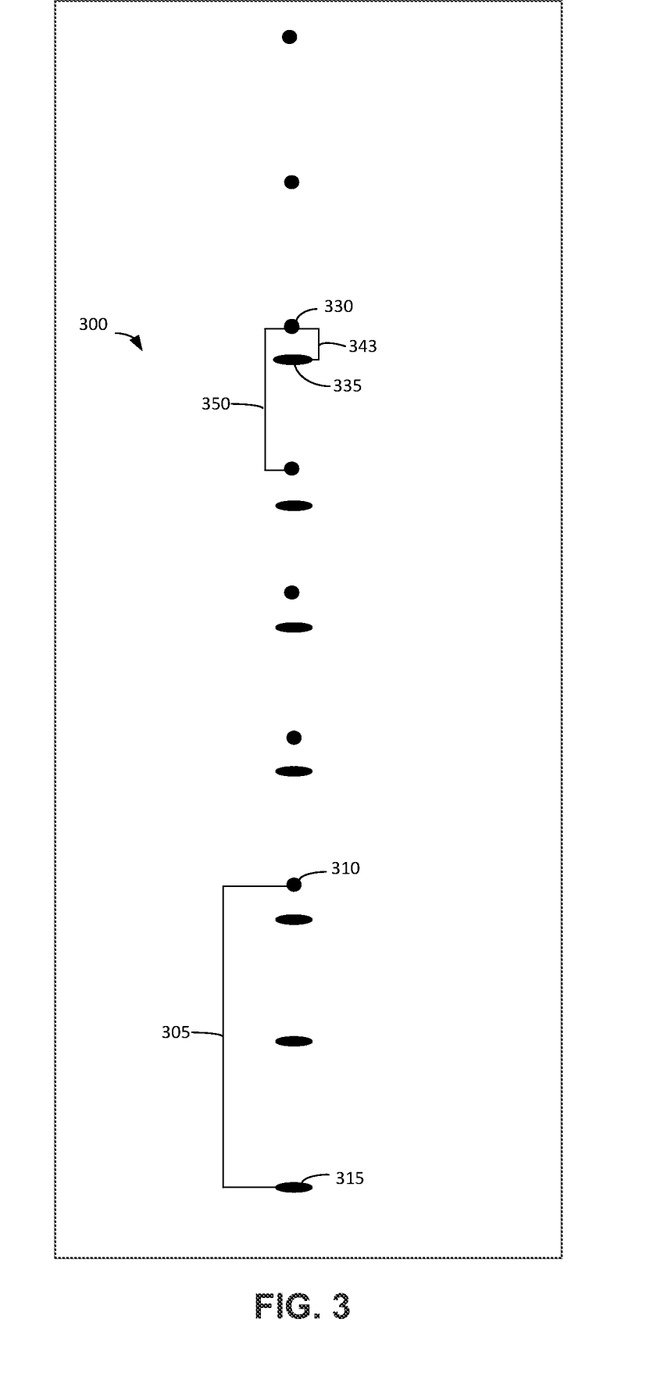
FIG. 3 illustrates an inline shot distribution in accordance with various implementations described herein.

FIG. 3 illustrates an example shot point record or an inline shot distribution 300 acquired using the acquisition system 200 of FIG. 2. The selected distance 305 used to acquire the inline shot distribution 300 corresponds to 2*ds+dx, but other selected distances may also be used to achieve similar shot distributions. For instance, the shot point 310 may correspond to the first shot point of the S1 source array 230, while the shot point 315 may correspond to the first shot point of the S2 source array 235. While seven sets of shots points for the two source arrays are shown in FIG. 3, a shot distribution for a seismic survey may include many more sets of shot points depending on the dimensions of the seismic survey.

One period 350 of the inline shot interval may correspond to the ds used to define the selected distance 305 in the inline direction obtained with Equation 3. The shot point separation distance 343 (i.e., dx) may be used for calculating the inline pressure source gradient between shot point 330 and shot point 335, or for any other applicable shot point pair.

Using the inline shot distribution 300 of FIG. 3, inline pressure gradients may be calculated using Equations 1 or 2. Seismic data corresponding to individual shot points that are in close proximity (e.g., those shot points separated by the shot point separation distance 343) may be recorded and separated out from seismic data for other shot points. For instance, using Equation 2 from above, the dh value may be substituted for the value of dx or the shot point separation distance 343. Measurements collected for a respective shot point pair, e.g., shot point 330 and shot point 335, may be determined from the seismic data acquired using the acquisition system 200. The inline pressure gradient for the respective pair of shot points may then be calculated by taking the difference between the measurements of both shot points and dividing the difference by the shot point separation distance 343 (i.e., dx).

While FIG. 3 shows the first shot point 315 of the S2 source array 235 at a staggered position behind the first shot point 310 of the S1 source array 230, in some implementations, the initial activation of the S2 source array 235 may simply be delayed until S2's activation time tracks the shot points of the S1 source array 230.

Seismic Acquisition for Crossline Pressure Source Gradients

Figure 4:
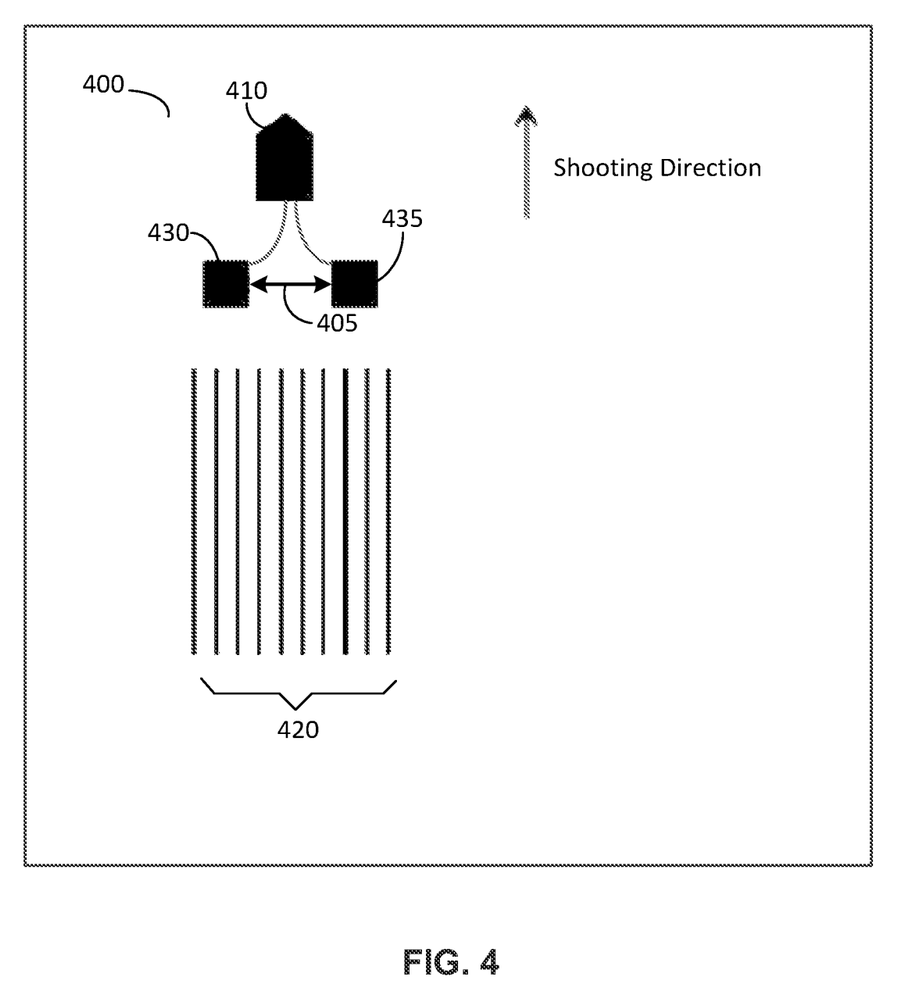
FIG. 4 illustrates a marine seismic survey acquisition system in accordance with various implementations described herein.

FIG. 4 illustrates a marine seismic survey acquisition system 400 using towed source arrays in accordance with various implementations described herein. Similar to the configuration shown in FIG. 2, the acquisition system 400 includes a vessel 410 towing a streamer array 420, an S1 source array 430 and an S2 source array 435. A shot distribution may be selected using this acquisition system 400 to produce respective shot point pairs for calculating pressure source gradients between shot points within a respective pair, as also described in reference to FIG. 2. For purposes of acquiring seismic data associated with shot points for either the S1 source array 430 or the S2 source array 435, simultaneous source separation techniques may be used that are similar to the ones used in the acquisition system 200 of FIG. 2.

Figure 5:
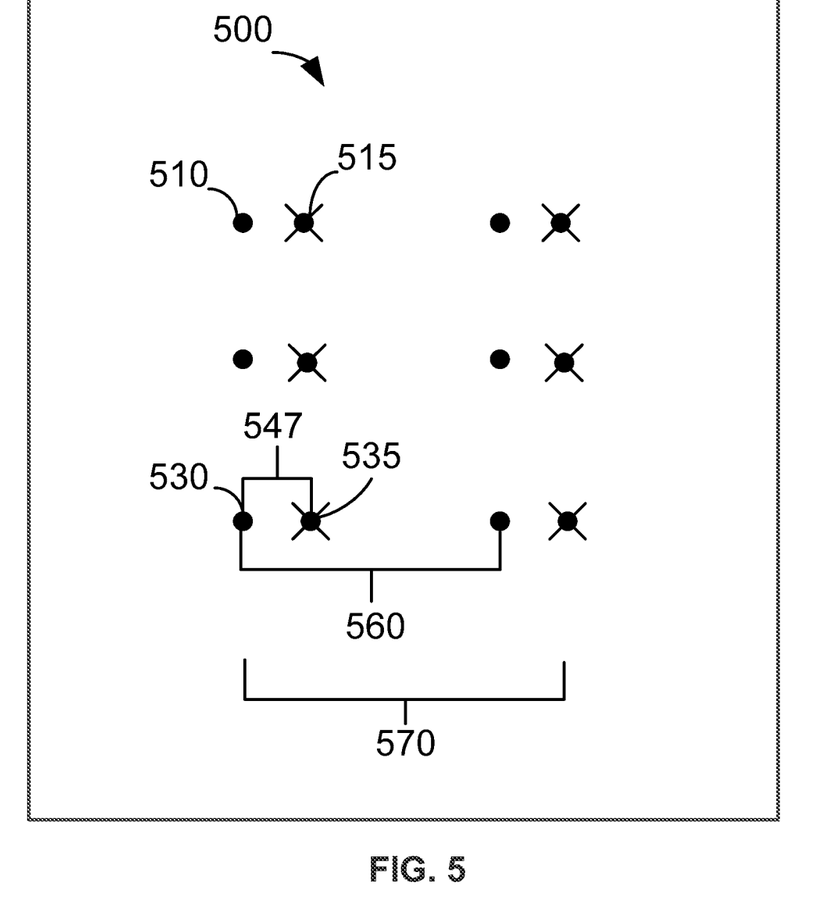
FIG. 5 illustrates a shot distribution in accordance with various implementations described herein.

In one implementation, the distance 405 in the crossline direction between the S1 source array 430 and the S2 source array 435 is selected to produce a shot distribution similar to the one shown in FIG. 5. The corresponding shot distribution for the acquisition system 400 may allow the crossline pressure source gradient to be determined between shot points that are within a predetermined range or in close proximity (e.g., dy from Equation 4) to one another in the shot distribution. For instance, the shot distribution produced during a seismic survey may result in respective pairs of crossline shot points that can be used to calculate crossline pressure source gradients between the respective shot points within the pairs. The distance 405 in the crossline direction may be calculated using the following equation:

$$\text{Source Separation in Crossline Direction} = (n*DS) \pm dy \quad \text{Equation 4}$$

Equation 4 is similar to Equation 3, but the inline shot interval ds is replaced with the source line interval (also referred to as the shot line interval) DS. A source line may also be referred to as the sail line for a corresponding source array. The source line interval may be the distance between two subsequent source lines, where the source line interval may be repeated throughout the seismic spread. The crossline sampling obtained for a seismic survey may correspond to the dimensions used for the source line interval. Since the acquisition system 400 may be configured for acquiring the crossline pressure source gradient, dx has been replaced with the shot point separation distance dy in the crossline direction. This distance dy may correspond to a predetermine range used for calculating the crossline pressure source gradient. For a practical example of dimensions used in the acquisition system 400, the distance dy may be 4 to 6 meters, while the source line interval DS may be from 37.5 m to 150 meters.

FIG. 5 illustrates a shot point record or a shot distribution 500 acquired using the acquisition system 400 of FIG. 4. The circular shot points 510 correspond to shot points acquired during a first traversal or first acquisition of a survey area. The circular shot points 515 with 'X's through them correspond to the shot points acquired during a second and inverse acquisition of the survey area. While three sets of shots points for the two source arrays are shown in FIG. 5, a shot distribution for a seismic survey may include many more sets of shot points depending on the dimensions of the seismic survey.

To obtain the shot distribution 500, a distance 560 in the crossline direction between the S1 source array 430 and the S2 source array 435 may be selected. In this instance, the selected distance 560 is DS−dy that is obtained using Equation 4, but other selected distances may also be chosen to achieve a similar shot distribution. For determining the DS value used in the selected distance 560, the source line interval 570 (also referred to as the shot line interval) for the seismic spread of the acquisition system 400 may be used. Likewise, the shot point separation distance 547 in the crossline direction, which may be used to calculate a pressure gradient, may provide the value of dy. The crossline pressure gradients for the shot distribution 500 may be computed in a similar manner as the inline pressure gradient, for instance, using measurements determined for shot point 530 and shot point 535.

The selected distance 560 may produce, in one acquisition, shot points offset from the source line interval 570 by dy. When a corresponding inverse acquisition is made, the acquisition system 400 may produce shot points that line up with the offset ones and thereby create respective pairs of crossline shot points that are separated by dy. Therefore, for a pair of crossline shot points, one shot point may be acquired during an acquisition in a particular direction, while the second shot point may be acquired during an inverse acquisition of the direction used to acquire the first shot point. In one implementation, while the selected distance 560 may result in a different effective source line interval between the S1 source array 430 and S2 source array 435, any other source arrays in the seismic spread, such as those unrelated to calculating pressure source gradients, may continue to use DS for crossline sampling purposes.

Seismic Acquisition for Inline and Crossline Pressure Source Gradients

Figure 6:
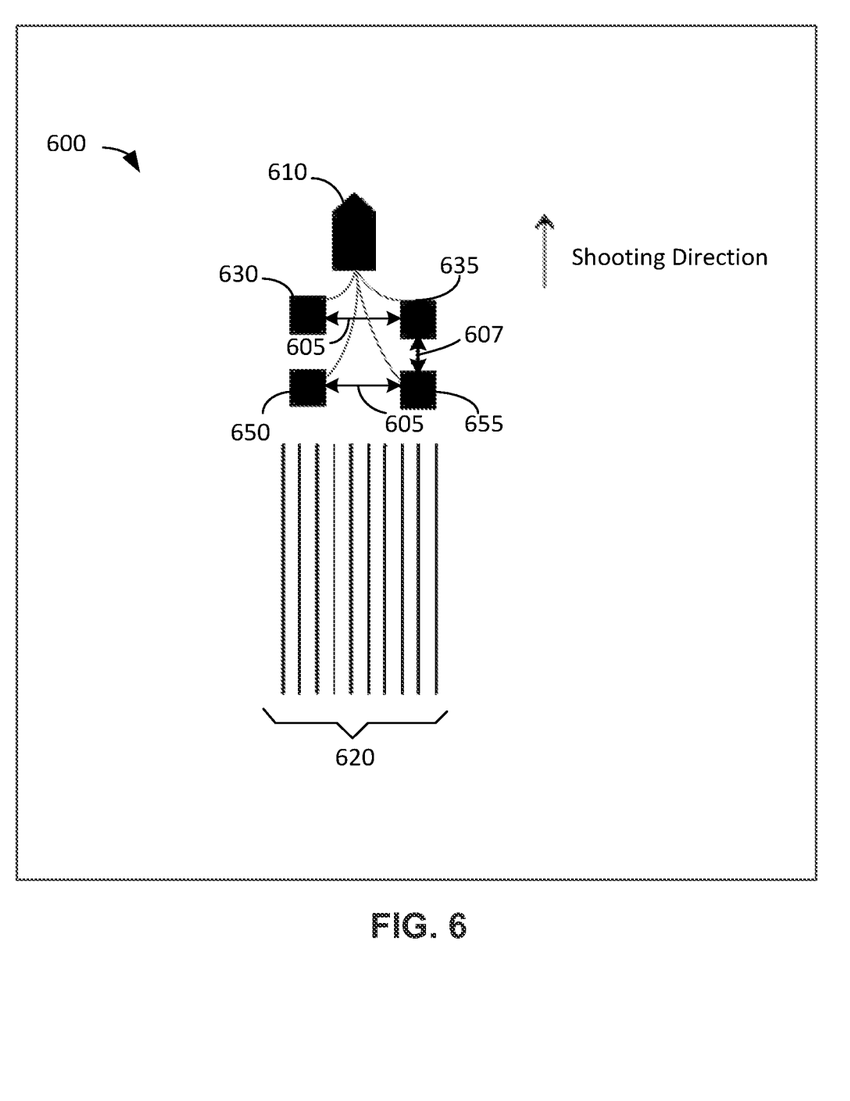
FIG. 6 illustrates a marine seismic survey acquisition system in accordance with various implementations described herein.

FIG. 6 illustrates a marine seismic survey acquisition system 600 using towed source arrays in accordance with various implementations described herein. Similar to the configurations shown in FIGS. 2 and 4, the acquisition system 600 includes a vessel 610 towing a streamer array 620, an S1 source array 630, an S2 source array 635, an S3 source array 650 and an S4 source array 655. The distance 607 in the inline direction between the S1 source array 630 and the S3 source array 650 (the same distance also between the S2 source array 635 and the S4 source array 655) is selected using Equation 3 above. The distance 605 in the crossline direction between the S1 source array 630 and the S2 source array 635 (also between the S3 source array 650 and the S4 source array 655) is selected using Equation 4 above. The corresponding shot distribution for the acquisition system 600 may allow both inline pressure source gradients as well as crossline pressure source gradients to be determined between respective pairs of shot points that are within a predetermined range or in close proximity (e.g., dx or dy from Equations 3 or 4, respectively) to one another in the shot distribution. For instance, the shot distribution may include respective pairs of inline shot points as well as respective pairs of crossline shot points. For purposes of acquiring seismic data for shot points for any of the source arrays, simultaneous source separation techniques similar to the ones used in the acquisition systems of FIG. 2 or 4 may be used with the acquisition system 600.

To obtain a selected shot distribution using the acquisition system 600, a shooting sequence may be chosen that includes S1+S3, S2+S4 or S1+S2+S3+S4 depending on data processing parameters. For instance, a shooting sequence may include shooting the S1 source array 630 and the S3 source array 650 (i.e., S1+S3) simultaneously and then after a predetermined period of time or according to a different inline shot interval shooting the S2 source array 635 and the S4 source array 655 (i.e., S2+S4) simultaneously. This shooting sequence may be selected in place of shooting the four source arrays simultaneously (i.e., S1+S2+S3+S4), because of constraints or parameters in data post-processing. If a shooting sequence of S1+S2+S3+S4 is used, the recorded seismic data for the S1 source array 630 may have to be separated from recorded seismic data for the other three source arrays, which may prove difficult.

Figure 7:
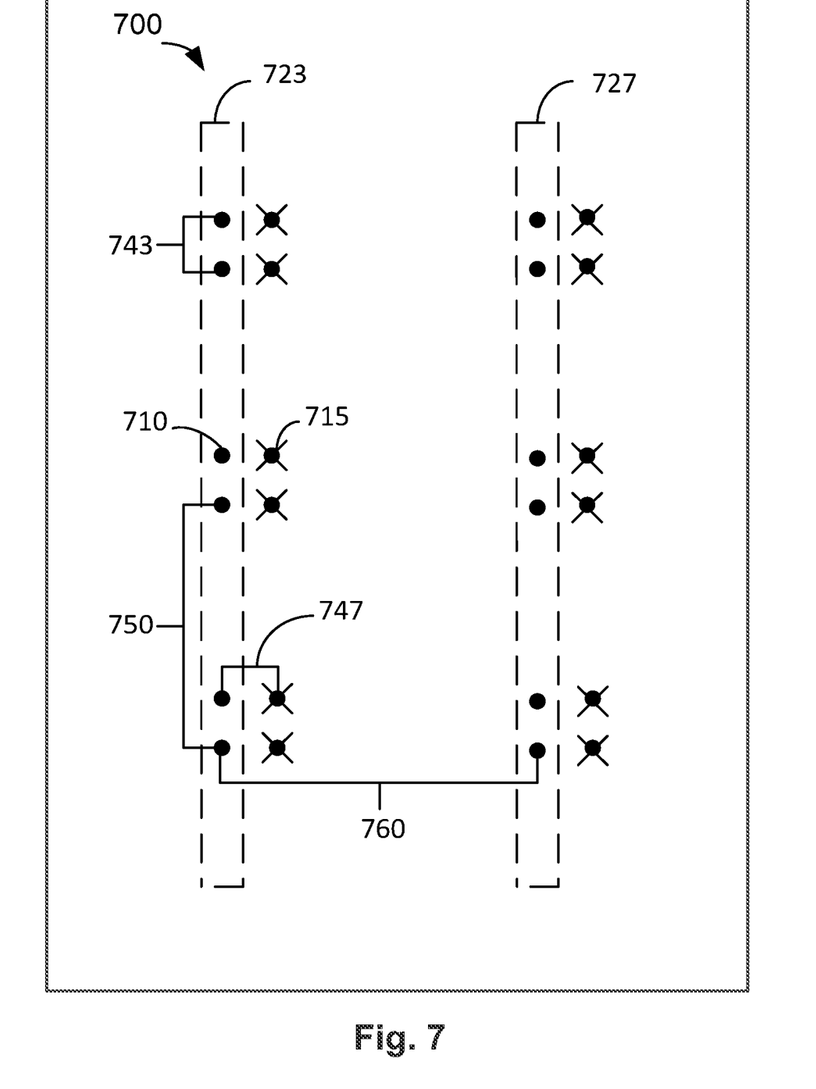
FIG. 7 illustrates a shot distribution in accordance with various implementations described herein.

FIG. 7 illustrates a shot point record or a shot distribution 700 for a four source array acquired using the acquisition system 600 of FIG. 6. The shot distribution 700 may be obtained using a combination of principles from the acquisition system 200 of FIG. 2 and/or the acquisition system of FIG. 4. The circular shot points 710 correspond to shot points acquired during a first traversal of a survey area. The circular shot points 715 with 'X's through them correspond to the shot points acquired during a second and inverse traversal of the survey area. While three sets of shots points for the four source arrays are shown in FIG. 7, a shot distribution for a seismic survey may include many more sets of shot points depending on the dimensions of the seismic survey. The first shot point column 723 shows the shot points produced during a traversal of the S1 source array 630 and the S3 source array 650. Likewise, the third shot point column 727 shows the shot points produced during a traversal of the S2 source array 635 and the S4 source array 655. Both shot point columns may resemble the inline shot distribution 300 described previously. In regard to the first shot point column 723, a shot point separation distance 743 (i.e., dx) may be used to produce respective pairs of inline shots points for calculating inline pressure source gradients. One period 750 of the inline shot interval may correspond to the ds used to define the source array separation distance between the S1 source array 630 and the S3 source array 650. In regard to the crossline source separation distance 760 that separates the first shot point column 723 and the third shot point column 727, it may be calculated in the same manner as was performed in the explanation for FIGS. 4 and 5. Similar to the shot point distribution 500 of FIG. 5, the crossline source separation distance 760 may achieve respective pairs of crossline shot points with a shot point separation distance 747 in the crossline direction. These respective pairs may be used to calculate corresponding crossline pressure source gradients.

The above acquisition systems and methods may also be applied to ocean bottom cables (OBC) or ocean bottom nodes (OBN) for calculating pressure source gradients. OBC technology may use multi-component sensor cables deployed on the ocean floor. In OBN technology, autonomous nodes may be deployed on the ocean floor for recording seismic wavefields reflecting from interfaces.

The above acquisition systems and methods may also be applied to other types of marine surveys. Such acquisition systems may be used with sonar or electromagnetic imaging to map underwater or subterranean surfaces. The sources described in FIGS. 1-7 may be sonar sources, electromagnetic sources, or any other type of source.

Attention is now directed to additional methods and systems in accordance with various embodiments or implementations of this disclosure. A method is disclosed that may deploy a marine seismic spread that may include a first seismic source, a second seismic source and a streamer with a receiver. The second seismic source may be disposed at a distance from the first seismic source in an inline direction. The distance may be selected to produce one or more pairs of shot points during a seismic survey. The shot points within a pair may be disposed within a predetermined range that is used to calculate a pressure source gradient between the shot points within the pair. The method may shoot the first seismic source and the second seismic source substantially simultaneously. The method may record seismic data associated with shooting the first seismic source and the second seismic source. The method may calculate the pressure source gradient for respective pairs of shot points.

In another implementation, the method may include pairs of shot points that are pairs of inline shot points. The distance may also be a function of the predetermined range and an inline shot interval used for the first seismic source or the second seismic source in the seismic survey. Shooting the first seismic source may be performed according to a substantially constant time interval, while shooting the second seismic source may be performed at a dither time referenced to the substantially constant time interval. The first and second seismic sources may be vibrators with emitted wavefields separated by a controllable phase. The method may decode one or more seismic wavefields that correspond to the first seismic source from the recorded seismic data in order to separate seismic data associated with the first seismic source from the second seismic source. The method may determine a difference between wavefield measurements at the shot point locations for at least one of the respective pairs. The difference may be determined with respect to a change in location between shot points in the at least one of the respective pairs. The method may interpolate multi-domain multi-component data using the pressure source gradient for respective pairs of shot points and pressure gradients at receiver positions in the seismic spread.

In some implementations, a system is provided that includes a vessel for towing a marine seismic spread. The seismic spread may include a first seismic source, a second seismic source and a streamer with a receiver. The second seismic source may be separated from the first seismic source at a distance in an inline direction. The distance in the inline direction may be selected to produce one or more pairs of shot points during a seismic survey. The shot points within a pair may be disposed within a predetermined range that is used in calculating a pressure source gradient between the shot points within the pair.

In another implementation, the system may produce pairs of shot points that are pairs of inline shot points. The distance may also be a function of the predetermined range and an inline shot interval used for the first seismic source or the second seismic source in the seismic survey. The first seismic source and the second seismic source may be shot substantially simultaneously. Shooting the first seismic source may be performed according to a substantially constant time interval, while shooting the second seismic source may be performed at a dither time referenced to the substantially constant time interval. The first and second seismic sources may be vibrators with emitted wavefields separated by a controllable phase.

In some implementations, a method is provided that deploys a marine seismic spread that may include a first seismic source, a second seismic source and a streamer with a receiver. The second seismic source may be disposed at a distance from the first seismic source in a crossline direction. The distance may be selected to produce one or more pairs of crossline shot points during a seismic survey. The crossline shot points within a pair may be disposed within a predetermined range that is used to calculate a pressure source gradient between the crossline shot points within the pair. The method may shoot the first seismic source and the second seismic source substantially simultaneously. The method may record seismic data associated with shooting the first seismic source and the second seismic source. The method may calculate the pressure source gradient for respective pairs of crossline shot points.

In another implementation, the distance may be a function of the predetermined range and a source line interval used for a plurality of seismic sources in the marine seismic spread. A first one of the crossline shot points within the pair may be acquired during an inverse acquisition of the direction used to acquire a second one of the crossline shot points within the pair. Shooting the first seismic source may be performed according to a substantially constant time interval, while shooting the second seismic source may be performed at a dither time referenced to the substantially constant time interval. The first and second seismic sources may be vibrators with emitted wavefields separated by a controllable phase. The method may decode one or more seismic wavefields that correspond to the first seismic source from the recorded seismic data in order to separate seismic data associated with the first seismic source from the second seismic source. The method may determine a difference between wavefield measurements at the crossline shot point locations for at least one of the respective pairs. The difference may be determined with respect to a change in location between crossline shot points in the at least one of the respective pairs. The method may interpolate multi-domain multi-component data using the pressure source gradient for respective pairs of crossline shot points and pressure gradients at receiver positions in the seismic spread.

In another implementation, the method may deploy a third seismic source and a fourth seismic source in the marine seismic spread. The fourth seismic source may be disposed at a distance from the third seismic source in an inline direction. The distance in the inline direction may be selected to produce one or more pairs of inline shot points during the seismic survey. The inline shot points within a pair may be disposed within a predetermined range that is used to calculate a pressure source gradient between the inline shot points within the pair. The method may shoot the third seismic source and the fourth seismic source substantially simultaneously. The method may record seismic data associated with shooting the third seismic source and the fourth seismic source. The method may calculate the pressure source gradient for respective pairs of inline shot points.

In some implementations, a system is provided that includes a vessel for towing a marine seismic spread. The seismic spread may include a streamer with a receiver, a first seismic source and a second seismic source. The second seismic source may be separated from the first seismic source at a distance in a crossline direction. The distance in the crossline direction may be selected to produce one or more pairs of crossline shot points during a seismic survey. The crossline shot points within a pair may be disposed within a predetermined range that is used in calculating a pressure source gradient between the crossline shot points within the pair.

In another implementation, the system may produce pairs of shot points that are pairs of inline shot points. The distance may also be a function of the predetermined range and an inline shot interval used for the first seismic source or the second seismic source in the seismic survey. The first seismic source and the second seismic source may be shot substantially simultaneously. Shooting the first seismic source may be performed according to a substantially constant time interval, while shooting the second seismic source may be performed at a dither time referenced to the substantially constant time interval. The first and second seismic sources may be vibrators with emitted wavefields separated by a controllable phase.

In some implementations, a system is provided that includes a vessel for towing a marine survey spread. The survey spread may include a streamer with a receiver, a first source and a second source. The second source may be separated from the first source at a distance in an inline direction. The distance in the inline direction may be selected to produce one or more pairs of shot points during a marine survey. The shot points within a pair may be disposed within a predetermined range that is used in calculating a source gradient between the shot points within the pair. The first or second source may produce sonar or electromagnetic waves. The distance in the inline direction may be a function of the predetermined range and an inline shot interval used for the first source or the second source in the marine survey. The first source and the second source may be shot substantially simultaneously.

In some implementations, the system may include a third source and a fourth source separated from the third source at a distance in a crossline direction. The distance in the crossline direction may be selected to produce one or more pairs of crossline shot points during the marine survey. The crossline shot points within a pair may be within a predetermined ranged that is used in calculating a source gradient between the crossline shots points within the pair. The distance in the crossline direction may be a function of the predetermined range and a source line interval used for sources in the marine survey spread.

In some implementations, a method for performing time-lapse monitoring of successive imaging procedures for a multi-dimensional region may be used in accordance with the various implementations described herein. In other implementations, the multi-dimensional region of interest is selected from the group consisting of a subterranean region, human tissue, plant tissue, animal tissue, volumes of water, volumes of air, and volumes of space near and/or outside the atmosphere of a planet, asteroid, comet, moon, or other body. Further, the multi-dimensional region of interest may include one or more volume types selected from the group consisting of a subterranean region, human tissue, plant tissue, animal tissue, volumes of water, volumes of air, and volumes of space near and/or or outside the atmosphere of a planet, asteroid, comet, moon, or other body.

Computing System

Implementations of various technologies described herein may be operational with numerous general purpose or special purpose computing system environments or configurations. Examples of well known computing systems, environments, and/or configurations that may be suitable for use with the various technologies described herein include, but are not limited to, personal computers, server computers, hand-held or laptop devices, multiprocessor systems, microprocessor-based systems, set top boxes, programmable consumer electronics, network PCs, minicomputers, mainframe computers, smartphones, smartwatches, personal wearable computing systems networked with other computing systems, tablet computers, and distributed computing environments that include any of the above systems or devices, and the like.

The various technologies described herein may be implemented in the general context of computer-executable instructions, such as program modules, being executed by a computer. Generally, program modules include routines, programs, objects, components, data structures, etc., that performs particular tasks or implement particular abstract data types. While program modules may execute on a single computing system, it should be appreciated that, in some implementations, program modules may be implemented on separate computing systems or devices adapted to communicate with one another. A program module may also be some combination of hardware and software where particular tasks performed by the program module may be done either through hardware, software, or both.

The various technologies described herein may also be implemented in distributed computing environments where tasks are performed by remote processing devices that are linked through a communications network, e.g., by hard-wired links, wireless links, or combinations thereof. The distributed computing environments may span multiple continents and multiple vessels, ships or boats. In a distributed computing environment, program modules may be located in both local and remote computer storage media including memory storage devices.

Figure 8:
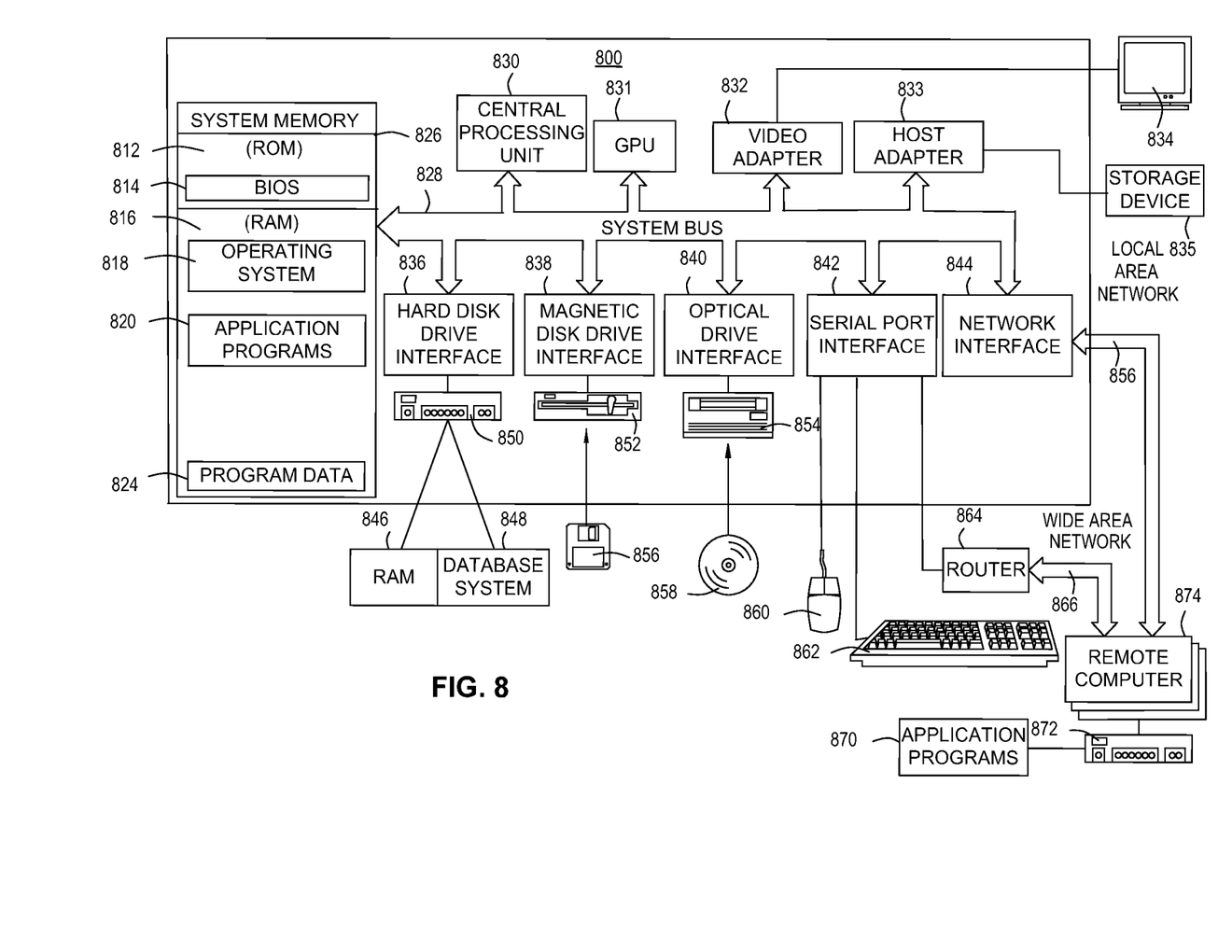
FIG. 8 illustrates a computing system in which the various technologies and techniques described herein may be incorporated and practiced.

FIG. 8 illustrates a schematic diagram of a computing system 800 in which the various technologies described herein may be incorporated and practiced. Although the computing system 800 may be a conventional desktop or a server computer, as described above, other computer system configurations may be used.

The computing system 800 may include a central processing unit (CPU) 830, a system memory 826, a graphics processing unit (GPU) 831 and a system bus 828 that couples various system components including the system memory 826 to the CPU 830. Although one CPU is illustrated in FIG. 8, it should be understood that in some implementations the computing system 800 may include more than one CPU. The GPU 831 may be a microprocessor specifically designed to manipulate and implement computer graphics. The CPU 830 may offload work to the GPU 831. The GPU 831 may have its own graphics memory, and/or may have access to a portion of the system memory 826. As with the CPU 830, the GPU 831 may include one or more processing units, and the processing units may include one or more cores. The system bus 828 may be any of several types of bus structures, including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. The system memory 826 may include a read-only memory (ROM) 812 and a random access memory (RAM) 846. A basic input/output system (BIOS) 814, containing the basic routines that help transfer information between elements within the computing system 800, such as during start-up, may be stored in the ROM 812.

The computing system 800 may further include a hard disk drive 850 for reading from and writing to a hard disk, a magnetic disk drive 852 for reading from and writing to a removable magnetic disk 856, and an optical disk drive 854 for reading from and writing to a removable optical disk 858, such as a CD ROM or other optical media. The hard disk drive 850, the magnetic disk drive 852, and the optical disk drive 854 may be connected to the system bus 828 by a hard disk drive interface 856, a magnetic disk drive interface 858, and an optical drive interface 850, respectively. The drives and their associated computer-readable media may provide nonvolatile storage of computer-readable instructions, data structures, program modules and other data for the computing system 800.

Although the computing system 800 is described herein as having a hard disk, a removable magnetic disk 856 and a removable optical disk 858, it should be appreciated by those skilled in the art that the computing system 800 may also include other types of computer-readable media that may be accessed by a computer. For example, such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computing system 800. Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. The computing system 800 may also include a host adapter 833 that connects to a storage device 835 via a small computer system interface (SCSI) bus, a Fiber Channel bus, an eSATA bus, or using any other applicable computer bus interface. Combinations of any of the above may also be included within the scope of computer readable media.

A number of program modules may be stored on the hard disk 850, magnetic disk 856, optical disk 858, ROM 812 or RAM 816, including an operating system 818, one or more application programs 820, program data 824, and a database system 848. The application programs 820 may include various mobile applications ("apps") and other applications configured to perform various methods and techniques described herein. The operating system 818 may be any suitable operating system that may control the operation of a networked personal or server computer, such as Windows® XP, Mac OS® X, Unix-variants (e.g., Linux® and BSD®), and the like.

A user may enter commands and information into the computing system 800 through input devices such as a keyboard 862 and pointing device 860. Other input devices may include a microphone, joystick, game pad, satellite dish, scanner or the like. These and other input devices may be connected to the CPU 830 through a serial port interface 842 coupled to system bus 828, but may be connected by other interfaces, such as a parallel port, game port or a universal serial bus (USB). A monitor 834 or other type of display device may also be connected to system bus 828 via an interface, such as a video adapter 832. In addition to the monitor 834, the computing system 800 may further include other peripheral output devices such as speakers and printers.

Further, the computing system 800 may operate in a networked environment using logical connections to one or more remote computers 874. The logical connections may be any connection that is commonplace in offices, enterprise-wide computer networks, intranets, and the Internet, such as local area network (LAN) 856 and a wide area network (WAN) 866. The remote computers 874 may be another a computer, a server computer, a router, a network PC, a peer device or other common network node, and may include many of the elements describes above relative to the computing system 800. The remote computers 874 may also each include application programs 870 similar to that of the computer action function.

When using a LAN networking environment, the computing system 800 may be connected to the local network 856 through a network interface or adapter 844. When used in a WAN networking environment, the computing system 800 may include a router 864, wireless router or other means for establishing communication over a wide area network 866, such as the Internet. The router 864, which may be internal or external, may be connected to the system bus 828 via the serial port interface 852. In a networked environment, program modules depicted relative to the computing system 800, or portions thereof, may be stored in a remote memory storage device 872. It will be appreciated that the network connections shown are merely examples and other means of establishing a communications link between the computers may be used.

The network interface 844 may also utilize remote access technologies (e.g., Remote Access Service (RAS), Virtual Private Networking (VPN), Secure Socket Layer (SSL), Layer 2 Tunneling (L2T), or any other suitable protocol). These remote access technologies may be implemented in connection with the remote computers 874.

It should be understood that the various technologies described herein may be implemented in connection with hardware, software or a combination of both. Thus, various technologies, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the various technologies. In the case of program code execution on programmable computers, the computing device may include a processor, a storage medium readable by the processor (including volatile and non-volatile memory and/or storage elements), at least one input device and at least one output device. One or more programs that may implement or utilize the various technologies described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations. Also, the program code may execute entirely on a user's computing device, partly on the user's computing device, as a stand-alone software package, partly on the user's computer and partly on a remote computer or entirely on the remote computer or a server computer.

Those with skill in the art will appreciate that any of the listed architectures, features or standards discussed above with respect to the example computing system 800 may be omitted for use with a computing system used in accordance with the various embodiments disclosed herein because technology and standards continue to evolve over time.

Of course, many processing techniques for collected data, including one or more of the techniques and methods disclosed herein, may also be used successfully with collected data types other than seismic data. While certain implementations have been disclosed in the context of seismic data collection and processing, those with skill in the art will recognize that one or more of the methods, techniques, and computing systems disclosed herein can be applied in many fields and contexts where data involving structures arrayed in a three-dimensional space and/or subsurface region of interest may be collected and processed, e.g., medical imaging techniques such as tomography, ultrasound, MRI and the like for human tissue; radar, sonar, and LIDAR imaging techniques; and other appropriate three-dimensional imaging problems.

While the foregoing is directed to implementations of various technologies described herein, other and further implementations may be devised without departing from the basic scope thereof. Although the subject matter has been described in language specific to structural features and/or methodological acts, it is to be understood that the subject matter defined in the appended claims is not limited to the specific features or acts described above. Rather, the specific features and acts described above are disclosed as example forms of implementing the claims

What is claimed is:

1. A method, comprising:
    deploying a marine seismic spread comprising:
        at least one streamer having at least one receiver;
        a first seismic source that is connected to and towed by a vessel; and
        a second seismic source that is connected to and towed by the vessel and is disposed at a distance from the first seismic source in an inline direction, wherein the distance is selected to produce one or more pairs of shot points during a seismic survey, wherein the shot points within a pair are disposed within a predetermined range that is configured to be used to calculate a pressure source gradient between the shot points within the pair;
    shooting the first seismic source and the second seismic source substantially simultaneously;
    recording seismic data associated with shooting the first seismic source and the second seismic source; and
    calculating the pressure source gradient for respective pairs of shot points, wherein calculating the pressure source gradient comprises determining a difference between wavefield measurements at the shot point locations for at least one of the respective pairs, and wherein the difference is determined with respect to a change in location between shot points in the at least one of the respective pairs.

2. The method of claim 1, wherein the one or more pairs of shot points are pairs of inline shot points.

3. The method of claim 1, wherein the distance is a function of the predetermined range and an inline shot interval used for the first seismic source or the second seismic source in the seismic survey.

4. The method of claim 1, wherein shooting the first seismic source is performed according to a substantially constant time interval, and wherein shooting the second seismic source is performed at a dither time referenced to the substantially constant time interval.

5. The method of claim 1, wherein the first and second seismic sources are vibrators with emitted wavefields separated by a controllable phase.

6. The method of claim 1, further comprising decoding one or more seismic wavefields that correspond to the first seismic source from the recorded seismic data in order to separate seismic data associated with the first seismic source from the second seismic source.

7. The method of claim 1, further comprising interpolating multi-domain multi-component data using the pressure source gradient for respective pairs of shot points and pressure gradients at receiver positions in the seismic spread.

8. A marine survey acquisition system, comprising:
    at least one vessel for towing a marine survey spread comprising:
        at least one streamer having at least one receiver;
        a first source that is connected to and towed by the vessel; and
        a second source that is connected to and towed by the vessel and is separated from the first source at a distance in an inline direction, wherein the distance in the inline direction is selected to produce one or more pairs of shot points during a marine survey, wherein the shot points within a pair are disposed within a predetermined range that is configured to be used in calculating a source gradient between the shot points within the pair, wherein calculating the source gradient comprises determining a difference between wavefield measurements at the shot point locations for at least one of the respective pairs, and wherein the difference is determined with respect to a change in location between shot points in the at least one of the respective pairs.

9. The marine survey acquisition system of claim 8, wherein the first or second sources produce sonar or electromagnetic waves.

* * * * *